United States Patent [19]

Invernizzi et al.

[11] Patent Number: 4,663,404

[45] Date of Patent: May 5, 1987

[54] METHOD FOR THE POLYMERIZATION OF ETHYLENE AND FOR THE COPOLYMERIZATION OF ETHYLENE WITH ALPHA-OLEFINS AND CATALYSTS FOR USE IN THE METHOD

[75] Inventors: Renzo Invernizzi, Milan; Federico Marcato, Nova Milanese, both of Italy

[73] Assignee: Enichimica Secondaria S.p.A., Italy

[21] Appl. No.: 847,138

[22] Filed: Apr. 2, 1986

Related U.S. Application Data

[63] Continuation of Ser. No. 658,243, Oct. 5, 1984, abandoned.

[30] Foreign Application Priority Data

Oct. 14, 1983 [IT] Italy ............................... 23299 A/83

[51] Int. Cl.$^4$ ........................... C08F 4/64; C08F 10/02
[52] U.S. Cl. .................................... 526/114; 502/113; 502/117; 526/125; 526/351
[58] Field of Search ......................... 502/113; 526/114

[56] References Cited

U.S. PATENT DOCUMENTS

| | | | |
|---|---|---|---|
| 4,109,071 | 8/1978 | Berger et al. | 526/114 |
| 4,245,071 | 1/1981 | Kondo et al. | 526/114 |
| 4,296,223 | 10/1981 | Berger | 526/114 |
| 4,368,305 | 1/1983 | Tanaka et al. | 526/114 |

*Primary Examiner*—Edward J. Smith
*Attorney, Agent, or Firm*—Sughrue, Mion, Zinn, Macpeak & Seas

[57] ABSTRACT

Method for the polymerization of ethylene and for the copolymerization of ethylene with alpha-olefins to give polymers and copolymers particularly suited to working by blow-moulding, by using a catalytic system constituted by:
(a) a trialkylaluminum; and
(b) a solid catalytic component obtained by the reaction of:
  (b1) an alkyaluminum halide, with
  (b2) the product of the reaction between a hafnium halide, an alcoholate of silicon, a magnesium halide, an aliphatic alcohol and a titanium alcoholate.

15 Claims, No Drawings

METHOD FOR THE POLYMERIZATION OF ETHYLENE AND FOR THE COPOLYMERIZATION OF ETHYLENE WITH ALPHA-OLEFINS AND CATALYSTS FOR USE IN THE METHOD

This is a continuation of application Ser. No. 658,243, filed 10.5.84, now abandoned.

The present invention relates to a method and a catalyst for the production in suspension in a liquid hydrocarbon and in a single polymerisation stage of polymers of ethylene or copolymers of ethylene with alpha-olefins having 3 or 4 carbon atoms having wide molecular weight distributions and which are particularly suited to working by blow-moulding.

Ziegler-type catalytic systems are known in the art which are active in the polymerisation of olefins and which are generally formed from a hydride or organometallic compound of elements from groups I and III and a compound of a transition metal from groups IV to VI of the periodic system. Generally an alkylaluminium is used as the organometallic compound and a titanium halide is used as the transition metal compound. It is also known that it is possible to deposit the titanium halide on, or bind to, a solid, granular substrate.

The ethylenic polymers made with these catalytic systems generally have a relatively narrow distribution of molecular weights, which makes them useful for working by injection moulding. Currently a need is felt to have ethylenic polymers available on the market with a wide distribution of molecular weights such they are suited to working by the blow-moulding technique. In particular a need is felt for the provision of ethylenic polymers having shearing stress sensitivities ($Q_F$) above 80 and perferably above about 100.

By the shearing stress sensitivity ($Q_F$) is meant the ratio of the melt-index value at 21.6 kg to the melt-index value at 2.16 kg measured at 190° C. The $Q_F$ value correlates with the molecular weight distribution in the sense that the higher the $Q_F$ value the wider the molecular weight distribution.

The molecular weight distribution in ethylenic polymers has been widened in the art mainly by carrying out the polymerisation in several stages and/or by the modification of that component of catalytic system which contains the transition metal compound by the introduction of other elements, particularly zirconium and vanadium. On this subject, reference is made to the specifications of U.S. Pat Nos. 4,109,071, 4,154,701, 4,192,772, 4,210,559, 4,226,964 and 4,245,071 and to the specification of published European Patent Application No. 19,637.

It has been noted, however, that the combination of zirconium or vanadium with titanium in the said component of the catalytic system reduces the activity of the catalyst and does not in any case widen the molecular weight distribution satisfactorily in the production of ethylenic polymers with relatively high values of the melt-index (of the order of 1-2). With these known catalytic systems, it is also difficult to produce ethylenic polymers for blow-moulding with the best combination of melt-index, density and $Q_F$ characteristics, particularly by methods which use a single polymerisation stage.

Thus, an object of the present invention is to provide a method and a catalytic system for the production of ethylenic polymers for blow-moulding which overcome or at least mitigate the problems mentioned above.

Accordingly, the present invention provides a method for the production in suspension in a liquid hydrocarbon and in a single polymerisation stage of polymers of ethylene or copolymers of ethylene with alphaolefins having 3 or 4 carbon atoms which is characterised in that the liquid reaction medium contains a catalytic system constituted by:
(a) a trialkylaluminium; and
(b) a solid catalytic component obtained by the reaction of:
(b1) an alkylaluminium halide, with
(b2) a product of the reaction between a hafnium halide, an alcoholate of silicon, a magnesium halide, an aliphatic alcohol and a titatnium alcoholate.

In the following description:
by "trialkylaluminium" is meant the compounds definable by $AlR_3$ where R represents a linear or branched chain alkyl radical containing from 1 to 5 carbon atoms; tributylaluminium and triisobutylaluminium are perferred;

by "alkylaluminium halide" is meant the compunds definable by $AlR_2X$, $AlRX_2$ and $Al_2R_3X_3$, where R is a linear or branched chain alkyl radical containing from 1 to 4 carbon atoms and X represents chlorine or bromine; ethylaluminium sesquichloride is preferred;

by "hafnium halide" is meants compounds with the formula $HfX_4$, where X represents chlorine or bromine; hafnium tetrachloride is preferred;

by "silicon alcoholate" is meant compounds with the formula $Si(OR)_4$, where R represents a linear or branched chain alkyl radical containing from 1 to 8 carbon atoms; silicon tetraethylate is preferred;

by "magnesium halide" is meant the compounds $MgX_2$, where X represents chlorine or bromine, magnesium chloride is preferred;

by "aliphatic alcohol" is meant the compounds ROH, where R represents a linear or branched chain alkyl radical containing from 1 to 5 carbon atoms; ethanol is preferred;

by "titanium alcoholate" is meant the compounds with the formula $Ti(OR)_4$, where R represents a linear or branched chain alkyl radical containing from 1 to 6 carbon atoms, titanium tetrabutylate is preferred.

According to the present invention, in the preparation of this solid catalytic component (b), a solid product (b2) is first prepared by a reaction between the hafnium halide, the silicon alcoholate, the magnesium halide, the aliphatic alcohol and the titanium alcoholate and then the product (b2) is reacted with an alkylaluminium halide.

More particularly, in the preparation of the solid product (b2), one mole of titanium alcoholate is brought into contact with, and reacted with, from 0.5 to 3 moles of hafnium halide, from 3 to 12 moles of silicon alcoholate, from 5 to 15 moles of magnesium halide and from 5 to 35 moles of aliphatic alcohol. In the preferred embodiment, from 1 to 2 moles of hafnium halide, from 4 to 10 moles of silicon alcoholate, from 7 to 12 moles of magnesium halide and from 5 to 30 moles of aliphatic alcohol are reacted per mole of titanium alcoholate.

The reaction between the compounds may be carried out in various ways.

In particular, in a first embodiment, the hafnium halide and the silicon alcoholate are reacted together at a temperature above the ambient temperature (from 40° to 160° C.) until a molten mass is obtained. The magnesium halide, the aliphatic alcohol and the titanium alcoholate are reacted together separately at a temperature above the ambient temperature (from 80° to 180° C.) until a second molten mass is obtained.

The two molten masses are mixed and homogenised and the homogeneous mixture thus obtained is dispersed in an inert hydrocarbon, the product (b2) thus being obtained in a physical form suitable for the subsequent reaction with the alkylaluminium halide.

In another embodiment, a solution of the magnesium halide in an aliphatic alcohol is spray dried in equi-flow or counter-flow with a hot inert gas to give a solid, spheroidal product comprising magnesium chloride with from 5 to 35% by weight of aliphatic alcohol. The solid, spheroidal product is then reacted with the titanium alcoholate, at a temperature above the ambient temperature (from 40° to 180° C.), possibly in the presence of an inert diluent. After the removal of any diluent, the solid particles are mixed and homogenised with a molten mass obtained by the reaction of the hafnium halide and the silicon alcoholate in the manner indicated in the description of the first embodiment. The product (b2) thus obtained is then dispersed in an inert hydrocarbon for the subsequent reaction with the alkylaluminium halide.

According to a further embodiment, the hafnium halide, the silicon alcoholate, the magnesium halide, the aliphatic alcohol and the titanium alcoholate are reacted together in an inert hydrocarbon at a temperature above the ambient temperature (from 80° to 180° C.). Thus the product (b2) is obtained in its hydrocarbon vehicle and is subjected to the reaction with the alkylaluminium halide.

According to a further embodiment, the hafnium halide and the silicon alcoholate are reacted together in an inert hydrocarbon at a temperature above the ambient (from 40° to 160° C.). The magnesium halide, aliphatic alcohol and titanium alcoholate are then added to the product obtained and reacted at a temperature above the ambient (from 80° to 180° C.). Thus an emulsion of the product (b2) is obtained which is then cooled rapidly to give a dispersion of the product (b2) in its hydrocarbon vehicle, preferably in the form of spherical granules. Finally the reaction with the alkylaluminium halide is carried out.

In the preparation of the solid, catalytic component (b) of the present invention, the product (b2) obtained as described above is reacted with alkylaluminium halide. Preferably this is carried out with the product (b2) in the solid or molten form dispersed in an inert hydrocarbon and from 15 to 35 gram moles of alkylaluminium halide, preferably from 20 to 30 gram moles, are used per gram atom of titanium in the product (b2). The reaction is carried out at a temperature above the ambient (from 30° to 90° C.) and the solid catalytic component (b) is finally obtained suspended in the hydrocarbon vehicle. For the purposes of the present invention, the solid catalytic component (b) may be used in suspension of after separation from the suspension.

In either case, the solid catalytic component (b) has a composition with atomic proportions definable by means of the following formula:

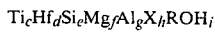

where $c=1$ d varies from 0.5 to 3
e varies from 1 to 6
f varies from 5 to 15
g varies from 1 to 15
h varies from 30 to 60
i varies from 1 to 10
X represents Cl or Br
R represents one or more alkyl groups with branched or linear chains containing from 1 to 6 carbon atoms.

When the reaction is carried out within the preferred range of conditions, the solid catalytic component (b) has a composition definable by means of the above formula, in which:

$c=1$
d varies from 1 to 2
e varies from 2 to 4
f varies from 7 to 12
g varies from 3 to 10
h varies from 38 to 53
i varies from 2 to 6

The solid catalytic component (b) is used in combination with the component (a) in the polymerisation of ethylene and in the copolymerisation of ethylene with alphaolefins. Typically, a quantity of trialkylaluminium of from 50 to 500 gram moles are used per gram atom of titanium in the solid catalytic component (b), 100 to 300 gram moles being preferred, and the liquid reaction medium is containing from 10 to 200 mg/l of component (b).

The catalytic system of the present invention is active in the polymerisation of ethylene and in the copolymerisation of ethylene with alpha olefins, particularly propylene and 1-butene. The polymerisation is conveniently carried out in suspension in a suitable liquid medium such as heptane, hexane or cyclohexane, under a partial pressure of ethylene of from 20 to 25 bar, at a temperature of from 60° to 90° C., polyethylene or copolymers of ethylene with propylene and 1-butene being obtained with melt-index values of from 0.08 to 2 g/10' (ASTM D 1238), with values of the absolute density of from 0.935 to 0.965 g/ml (DIN 53479) and with $Q_F$ values greater than or equal to about 80 and up to about 180. More particularly the values of the absolute density generally vary from about 0.958 to about 0.965 g/ml in the homopolymerisation of ethylene and from about 0.935 to about 0.958 g/ml in the copolymerisation of ethylene with propylene or with 1-butene, in a single polymerisation stage.

In each case the ethylene polymer obtained has E.S.C.R. values (environmental stress cracking resistance) of more than 1000 hours (ASTM D-1693 bell test).

It should be noted that it is possible to influence the $Q_F$ value not only by means of the particular catalytic system used but also by means of the polymerisation temperature and the quantity of hydrogen used at the molecular weight regulator, as will become apparent from the experimental examples which follow.

The catalytic systems of the present inventions are active in the polymerisation processes to such a high degree that it is not necessary to separate the catalytic residues from the ethylenic polymers or copolymers.

The catalytic residue (expressed as metallic Ti) present in the ethylenic polymers or copolymers is always lower than 10 ppm and typically lower than 3 ppm.

In each case, given its wide molecular weight distribution, the ethylenic polymer or copolymer is suitable for working by blow-moulding, even when the melt-index is relatively high.

Finally, the possibility of carrying out the polymerisation reaction in a single stage has considerable advantages from an economic point of view.

The experimental examples which follow are illustrative and non-limiting of the invention.

EXAMPLE 1

(a) Solid, powdered hafnium tetrachloride ($HfCl_4$; 3 g; 0.0093 moles—commercial product made by the CEZUS company) is placed in a glass flask fitted with a dropping funnel, a thermometer, a stirrer and a reflux condenser. An atmosphere of nitrogen is maintained in the flask and silicon tetraethylene ($Si(O-C_2H_5)_4$; 14.2 ml, 0.0063 moles—commercial product DYMASIL A made by the DYNAMIT NOBEL company) is dropped slowly and gradually through the dropping funnel. During the addition, which is carried out over a period of about 30 minutes, the mass is kept under reflux at about 80° C.

After the addition of the silicon tetraethylate, the temperature of the mass is brought to 100° C. and this temperature is maintained for about 1 hour, a molten mass being obtained at the end of this period.

(b) A glass flask fitted with a dropping funnel, a thermometer, a stirrer and a reflux condenser is loaded at ambient temperature with the following: magnesium chloride ($MgCl_2$: 7.5 g; 0.078 moles—commercial product made by the CEZUS company), anhydrous ethanol (13 ml; 0.222 moles),—titanium tetrabutylate ($Ti-(O-C_4H_9)_4$; 2.4 ml; 0.007 moles—commercial product made by the KRONOS company).

The temperature is brought to 140° C. and the mass is kept at this temperature for about 2 hours, a molten mass being obtained at the end of this period.

(c) the molten mass, at 100° C., obtained in part (a) of the Example is poured into the molten mass at 140° C. obtained in part (b) of the Example. The resulting molten mass is heated to 140° C. and kept at this temperature for a further two hours, the mass being stirred slowly under reflux.

At the end of this time, the mass is cooled to 80° C., 100 ml of a $C_{10}-C_3$ liquid paraffin mixture (commercial product LIMESOL made by the SHELL company) previously dried by passage over 3A molecular sieves, being added during the cooling. Thus the molten mass is dispersed in the hydrocarbon vehicle.

The dispersion is kept at 80° C. under slow stirring and 30 ml of ethylaluminum sesquichloride (($C_2H_5$)$_3Al_2Cl_3$; 0.132 moles—commercial product made by the ETHYL CORP company) dispersed in 70 ml of the LIMESOL paraffin mixture are added gradually over about 30 minutes. During this addition a solid precipitate is formed which can readily settle. At the end of the addition, the dispersion obtained is kept under agitation for 2 hours at 80° C. and then cooled to the ambient temperature.

The suspended solid is subjected to chemical analysis and the following composition, expressed in percentages by weight, is found:

Mg: 11.4%
Cl: 59.3%
Ti: 2.1%
Hf: 7.9%
EtOH: 10.3%
BuOH: 1.8%
Al: 4.0%
Si: 3.2%

Hence the component (b) of the catalytic system thus obtained has the chemical elements Mg; Cl, Ti; Hf, Al; Si in the following atomatic proportions 10.7; 38; 1; 1; 3.4; 2.6.

The average grain size of the suspended solid determined by electron microscopy is 3–5 μm; the form of the solid is irregular.

(d) 2 liters of anhydrous heptane containing 1 g (0.005 Moles) of tri-isobutylaluminum are loaded into a 4-liter autoclave fitted with a turbine stirrer. 100 mg of the solid obtained in the preceding paragraph, in its suspension, are then added. The stirrer is rotated at 750 revolutions per minute and ethylene is polymerised in the presence of hydrogen, the experiment being continued for two hours.

More particularly, in the first test the polymerisation is carried out at 80° C. with the total pressure maintained at 10 bar with 59% of hydrogen and a polyethylene is obtained with a melt-index of 1.5 g/10' (ASTM D 1238 method) and a $Q_F$ value of 80, 400,000 g of polymer being produced per gram of titanium.

In a second test the polymerisation is carried out at 70° C., with the total pressure maintained at 11 bar with 67% of hydrogen and a polyethylene is obtained with a melt-index of 0.25 and a $Q_F$ value of 120, 200,000 g of polymer being produced per gram of titanium.

A third test is carried out with a total pressure of 12 bar with 75% of hydrogen and a polyethylene is obtained with a melt-index of 0.18 and a $Q_F$ value of 166, 100,000 g of polymer being produced per gram of titanium.

In each case the polyethylene produced is in the form of a white powder with a density of 0.962 g/ml.

Wholly similar results are obtained when the solid obtained from stage (c) is used as the component of the catalytic system after separation from its suspension, washing with heptane and drying.

EXAMPLE 2

(a) This is carried out exactly as in part (a) of Example 1, hafnium tetrachloride (3 g) being reached with silicon tetraethylate (14.2 ml) and a molten mass being obtained at 100° C.

(b) Commercial magnesium chloride (water content of 0.7% by weight, in the form of flakes with dimensions of from 0.1 to 2 mm) is placed in substantially anhydrous ethanol (water content less than 0.2% by weight) and is heated to 100° C. until a solution is obtained with a concentration of the salt of 300 g/l. This solution is fed to spray-drying apparatus which is operated with an inlet temperature of the gaseous nitrogen flow of 250° C., an outlet temperature of the gaseous nitrogen flow of 150° C., in a manner similar to that described in Example 7 of European published patent application No. 0065,700. Thus a solid is obtained which contains magnesium chloride and ethanol in microspherical form with a size of 30–40 μm with an ethanol content of 27% by weight, a porosity of 0.75 ml/g and a specific surface of 4 m²/g.

This solid product (6.5 g) is suspended in anhydrous heptane (50 ml) and 2.4 ml (0.007 moles) of titanium tetrabutylate are added to the suspension. These are reacted for 24 hours at 100° C., the heptane being evaporated and the mass being maintained under slow agitation. At the end of this period of time the mass is cooled and a spheroidal, granular solid separates.

(c) The molten mass at 100° C. obtained in part (a) of the present example is poured onto the spheroidal, granular solid obtained in part (b) of this example. The entire mass is heated to 150° C. and kept at this temperature under nitrogen, with slow stirring for four hours. At the end of this period of time, the particles are cooled to ambient temperature and are then dispersed in 100 ml of anhydrous heptane.

The dispersion is heated to 80° C. under slow stirring and 50 ml of ethylaluminum sesquichloride (0.22 moles) diluted with 50 ml of heptane are added gradually over 30 minutes. At the end of this addition the temperature is kept at 80° C. for 24 hours and then the mass is cooled to the ambient temperature.

The suspended solid is subjected to chemical analysis and the following composition is determined, given in percentage by weight:

Mg: 10%
Cl: 59%
Ti: 1.5%
Hf: 9%
EtOH: 7.5%
BuOH: 2%
Al: 8%
Si: 3%

Hence the component (b) of the catalytic system obtained has the chemical elements Mg:Cl:Ti:Hf:Al:Si in the following atomic proportions 13.1:53.1:1:1:1.6:9.4:3.4. The average grain size of the suspended solid is 30 μm, the form being spherical.

(d) 2 liters of anhydrous heptane containing 1 g (0.005 moles) of tri-isobutylaluminum are loaded into a 4 liter autoclave provided with a turbine stirrer 100 mg of the solid obtained in the preceding paragraph, in its suspension, are then added. The stirrer is rotated at 750 revolutions per minute and ethylene is polymerised in the presence of hydrogen, the test being carried out for 2 hours.

More particularly, in the first test the polymerisation is carried out at 85° C. with a total pressure maintained constant at 12 bar with 54% of hydrogen and a polyethylene is obtained with a melt-index value of 0.25 g/10′ and a $Q_F$ value of 85, 1,000,000 grams of polymer being obtained per gram of titanium.

In a second test the polymerisation is carried out at 80° C., with a total pressure maintained at 11 bar with 60% of hydrogen and a polyethylene is obtained with a melt-index value of 0.25 and a $Q_F$ value of 97, 700,000 g of polymer being produced per gram of titanium.

In each case the polyethylene produced is in the form of spheroidal granules with a grain size of 600–700 μm and a density of 0.96 g/ml.

A series of ethylene polymerisation tests is carried out under the conditions described above with the difference that 1.7 g (0.0086 moles) of tri-isobutylaluminum are used in combination with 100 mg of the solid obtained according to paragraph (b). More particularly, in the first test the ethylene is polymerised at 80° C. with a total pressure maintained at 10 bar with 60% of hydrogen and a polyethylene is obtained with a melt index value of 0.28 g/10′ and a $Q_F$ value of 105, 600,000 g of polymer being produced per gram of titanium.

In a second test ethylene is polymerised at 70° C. with a total pressure maintained at 11 bar, with 70° C. of hydrogen and a polyethylene is obtained with a melt-index value of 0.22 and a $Q_F$ value of 135, 300,000 g of polymer being obtained per gram of titanium.

In a third test the ethylene is polymerised at 60° C. with a total pressure maintained at 12 bar, with 80% of hydrogen and a polyethylene is obtained with a melt-index value of 0.20 and a $Q_F$ value of 180, 150,000 g of polymer being obtained per gram of titanium.

In all these tests the polyethylene is formed as spheroidal particles. Its density varies within a range of from 0.962 to 0.958.

Entirely similar results are obtained when the solid obtained in stage (c), is used as the component of the catalytic system after separation from its suspension.

EXAMPLE 3

(a) 40 g (0.125 moles) of hafnium tetrachloride and 60 ml (0.268 moles) of silicon tetraethylate are loaded into a flass flask in an atmosphere of nitrogen, the flask being fitted with a dropping funnel, a thermometer, a stirrer and a reflux condenser. The mixture is left in contect under slow stirring for 20 minutes at the ambient temperature (20°–25° C.).

(b) About 55 g (0.577 moles) of magnesium chloride, 60 ml (1.028 moles) of ethanol, 20 ml (0.059 moles) of titanium tetrabutylate and 300 ml of a previously dried $C_{10}$–$C_{13}$ liquid paraffin mixture LIMESOL are then added to the same flask. The addition is carried out at the ambient temperature and then the temperature is raised to 140° C. and the mass is maintained under these conditions, under nitrogen and with slow stirring for two hours.

(c) An emulsion is thus obtained which is colled to 80° C. and then 300 ml (1.324 moles) of ethylaluminium sesquichloride are then added slowly over a period of two hours. During the addition a solid is precipitated. After cooling to the ambient temperature the suspended solid is subjected to chemical analysis and the following composition, expressed in percentage by weight, is found:

Si: 2.8%
Mg: 8.9%
Cl: 62.9%
Ti: 1.9%
Hf: 11.9%
EtOH: 4.3%
BuOH: 1.0%
Al: 6.3%

Hence the component (b) of the catalytic system obtained has the chemical elements Mg:Cl:Ti:Hf:Al:Si in the following atomic proportions 9.2:44.8:1:1.7:5.9:2.5.

The average grain size of the suspended solid is 5–7 μm; the form of the solid is irregular.

(f) 2 liters of anhydrous heptane containing 0.2 g (0.001 moles) of tri-isobutylaluminium are loaded into a 4 liter autoclave provided with a turbine stirrer. 100 mg of the solid obtained in the preceding paragraph, in its suspension, are then added. The stirrer is rotated at 750 revolutions per minute and a mixture of ethylene and 1-butene is polymerised in the presence of hydrogen, the test lasting for 2½ hours. More particularly, the polymerisation is carried out at 80° C., a total pressure of 12 bar being maintained with 65% of hydrogen and with 2.5% by weight of 1-butene in the heptane phase, and an ethylene-1-butene copolymer is obtained in the form of a powder with an average grain size of 400 μm, with a melt index of 0.2 g/10′, a $Q_F$ of 120, a density of 0.955 g/ml, an environmental stress cracking resistance (ESCR) of more than 1000 hours (ASTM D-1693 Bell Test method) and ratio of the weight-average molecular weight to the number-average molecular weight (Mw/Mn) of more than 15 (GPC method), 750,000 of copolymer being obtained per gram of titanium.

Wholly similar results are obatained when the solid obtained in stage (c) is used as the component of the catalytic system, after separation from its suspension.

EXAMPLE 4

(a) 1 liter of anhydrous heptane, 40 g (0.125 moles) of hafnium tetrachloride and 70 ml (0.313 moles) of silicon tetraethylate are loaded into a 3 liter autoclave provided with a stirrer and a tube dipping into the bottom of the vessel. The content of the autoclave are heated for one hour to 100° C. under a pressure of 4 bar of nitrogen, the mass being kept stirred.

(b) At the end of this period, the contents of the autoclave are cooled to ambient temperature (20°-25° C.) and 55 g (0.577 moles) of magnesium chloride, 50 ml (0.856 moles) of ethanol and 20 ml (0.059 moles) of titanium tetrabutylate are added. The contents of the autoclave are heated to 180° C. for 14 hours under a pressure of 10 bar of nitrogen, the mass being stirred.

(c) An emulsion is thus obtained which is fed to one end of, and forced through, a tube having a heating jacket supplied with oil at 150° C., with an internal diameter of 0.8 mm and a length of 4.5 m. The other end of the tube dips into a 5 liter flask fitted with a stirrer, cooled with water and containing 3 liters of heptane and 300 ml (1.324 moles) of ethylaluminium sesquichloride. An atmosphere of nitrogen is maintained in the flask and the content are kept stirred. The flow rate of the suspension through the tube is adjusted so as to ensure that the mass in the flask is kept at a temperature of 60°-70° C.

Under these conditions a spheroidal solid separates in the flask with an average diameter of 15 μm, and with grain sized of from 10 to 20 μm.

The suspended solid is subjected to chemical analysis and the following composition expressed in percentages by weight is found:

Mg: 7.8%
Cl: 65%
Ti: 1.8%
Hf: 12.1%
EtOH: 3.8%
BuOH: 1.0%
Al: 5.0%
Si: 3.5%

Hence the component (b) of the catalytic system obtained has the chemical elements: Mg:Cl:Ti:Hf:Al:Si: in the following atomic proportions 8.5:48.9:1:1.8:4.9:3.3.

(d) 2 liters of anhydrous heptane containing 0.2 g (0.001 moles) of tri-isobutylaluminium are loaded into a 4 liter autoclave fitted with a turbine stirrer. 100 mg of the solid obtained in the preceding paragraph, in its suspension, are then added. The stirrer is rotated at 750 revolutions per minute and a mixture of ethylene and 1-butene is polymerised in the presence of hydrogen, the test lasting 2 hours. More particularly, the polymerisation is carried out at 80° C., a total pressure of 12 bar being maintained, with 65% hydrogen, with 2.5% by weight of 1-butene in the heptane phase, and an ethylene-1-butene copolymer is obtained in the form of spheroidal granules having an average size of 450 μm with a melt-index of 0.16 g/10', a $Q_F$ of 150, a density of 0.954 g/ml, an ESCR value of more that 1000 hours, Mw/Mn of 18, 850,000 g of copolymer being produced per gram of titanium.

Entirely similar results are obtained with the use of the solid obtained in stage (c) as the component of the catalytic system after separation from its suspension.

We claim:

1. Method for the production in suspension in a liquid hydrocarbon and in a single polymerization stage of polymers of ethylene or copolymers of ethylene with alpha-olefins having 3 to 4 carbon atoms, by running the polymerization reaction at a temperature of from 60° to 90° C., with a partial pressure of ethylene of from 2 to 25 bars, in the presence of hydrogen as a regulator of the molecular weight characterized in that the liquid reaction medium contains a catalytic system consisting of (a) a trialkylaluminum; and
(b) a solid catalytic component obtained by the reaction of
(b1) an alkylaluminum halide, with
(b2) the reaction product of a hafnium halide, an alcoholate of silicon, a magnesium halide, an aliphatic alcohol and a titanium alcoholate, with atomic proportions definable by means of the formula $Ti_c Hf_d Si_e Mg_f Al_g X_h (ROH)_i$ where
$c = 1$
d varies from 0.5 to 3
e varies from 1 to 6
f varies from 5 to 15
g varies from 1 to 15
h varies from 30 to 60
i varies from 1 to 10
X represents Cl or Br
R represents at least one linear or branched alkyl radical containing from 1 to 6 carbon atoms; the quantity of the said trialkylaluminum being of from 50 to 500 gram moles per gram atom of titanium in the said component (b), and the liquid reaction medium contains from 10 to 200 mg/l of the solid catalytic component (b)

and wherein said halfnium halide is a compound with a formula $HfX_4$, where X represents chlorine or bromine;

said silicon alcoholate is a compound with a formula $Si(OR)_4$ where R represents a linear or branched chain alkyl radical containing from 1 to 8 carbon atoms;

said magnesium halide is a compound $MgX_2$, where X represents chlorine or bromine;

said aliphatic alcohol is a compound ROH, where R represents a linear or branched chain alkyl radical containing from 1 to 5 carbon atoms;

said titanium alcoholate is a compound with a formula $Ti(OR)_4$, where R represents a linear or branched chain alkyl radical containing from 1 to 6 carbon atoms.

2. Method according to claim 1 in which the values of the indices of the formula representing the solid catalytic component (b) are the following:

$c = 1$
d varies from 1 to 2
e varies from 2 to 4
f varies from 7 to 12
g varies from 3 to 10
h varies from 38 to 53
i varies from 2 to 6.

3. Method according to claim 1, characterised in that the trialkylaluminum is tributylaluminum or tri-isobutylaluminum.

4. Method according to claim 1, characterised in that the alkylaluminum halide is ethylaluminum sesquichloride.

5. Method according to claim 1, characterised in that the hafnium halide is hafnium tetrachloride.

6. Method according to claim 1, characterised in that the silicon alcoholate is silicon tetraethylate.

7. Method according to claim 1, characterised in that the magnesium halide is magnesium chloride.

8. Method according to claim 1, characterised in that the aliphatic alcohol is ethanol.

9. Method according to claim 1, characterised in that the titanium alcoholate is titanium tetrabutylate.

10. Method according to claim 1, characterised in that the product (b2) is made by the reaction of one mole of titanium alcoholate with from 0.5 to 3 moles of hafnium halide, from 3 to 12 moles of silicon alcoholate, from 5 to 15 moles of magnesium halide and from 5 to 35 moles of aliphatic alcohol.

11. Method according to claim 1, characterised in that the product (b2) is made by the reaction of one mole of titanium alcoholate with from 1 to 2 moles of hafnium halide, from 4 to 10 moles of silicon alcoholate, from 7 to 12 moles of magnesium halide and from 5 to 30 moles of aliphatic alcohol.

12. Method according to claim 1, characterised in that the component (b) of the catalytic system is made by the reaction of 15-35 moles of alkylaluminum halide with a quantity of the product (b2) in the solid or molten form suspended in an inert hydrocarbon and containing one gram atom of titanium.

13. Method according to claim 12, characterised in that the component (b) is made by the reaction of 20-30 gram moles of alkylaluminum halide with a quantity of the product (b2) containing 1 gram atom of titanium.

14. Catalytic system active in the polymerization of ethylene or in the copolymerization of ethylene with alpha-olefins having 3 or 4 carbon atoms, consisting of
   (a) a trialkylaluminum; and
   (b) a solid catalytic component obtained by the reaction of
       (b1) an alkylaluminum halide, with
       (b2) the reaction product of a hafnium halide, an alcoholate of silicon, a magnesium halide, an aliphatic alcohol and a titanium alcoholate, with atomic proportions definable by means of the formula $Ti_c Hf_d Si_e Mg_f Al_g X_h (ROH)_i$;
where
   $c = 1$
   d varies from 0.5 to 3
   e varies from 1 to 6
   f varies from 5 to 15
   g varies from 1 to 15
   h varies from 30 to 60
   i varies from 1 to 10
   X represents Cl or Br
   R represents at least one linear or branched alkyl radical containing from 1 to 6 carbon atoms; the quantity of the said trialkylaluminum being of from 50 to 500 gram moles per gram atom of titanium in the said component b
and wherein said halfnium halide is a compound with a formula $HfX_4$, where X represents chlorine or bromine;
said silicon alcoholate is a compound with a formula $Si(OR)_4$ where R represents a linear or branched chain alkyl radical containing from 1 to 8 carbon atoms;
said magnesium halide is a compound $MgX_2$, where X represents chlorine or bromine;
said aliphatic alcohol is a compound ROH, where R represents a linear or branched chain alkyl radical containing from 1 to 5 carbon atoms;
said titanium alcoholate is a compound with a formula $Ti(OR)_4$, where R represents a linear or branched chain alkyl radical containing from 1 to 6 carbon atoms.

15. Catalytic system according to claim 14 wherein the values of the indices of the formula representing the solid catalytic component (b) are the following:
   $c = 1$
   d varies from 1 to 2
   e varies from 2 to 4
   f varies from 7 to 12
   g varies from 3 to 10
   h varies from 38 to 53
   i varies from 2 to 6.

* * * * *